(12) United States Patent
Fan et al.

(10) Patent No.: US 10,913,599 B2
(45) Date of Patent: Feb. 9, 2021

(54) PICKING RACK

(71) Applicant: INDUSTRIAL TECHNOLOGY RESEARCH INSTITUTE, Hsinchu (TW)

(72) Inventors: Chen-Jyh Fan, Hsinchu (TW); Wan-Ru Huang, Hsinchu (TW); Wen-Hsin Lin, Hsinchu (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 0 days.

(21) Appl. No.: 16/527,230

(22) Filed: Jul. 31, 2019

(65) Prior Publication Data

US 2020/0331697 A1 Oct. 22, 2020

(30) Foreign Application Priority Data

Apr. 17, 2019 (TW) .............................. 108113489 A

(51) Int. Cl.
*B65G 1/02* (2006.01)
*B65G 1/04* (2006.01)
*B65G 1/10* (2006.01)

(52) U.S. Cl.
CPC ........... *B65G 1/026* (2013.01); *B65G 1/0492* (2013.01); *B65G 1/10* (2013.01)

(58) Field of Classification Search
CPC ........ B65G 1/026; B65G 1/10; B65G 1/0492; B65D 25/005; B65D 7/16; B65D 7/40; A47B 57/08; A47B 51/00; A47B 57/265
See application file for complete search history.

(56) References Cited

U.S. PATENT DOCUMENTS

| 2,504,490 | A | | 4/1950 | Broder | |
|---|---|---|---|---|---|
| 3,674,159 | A | * | 7/1972 | Lemelson | B65G 1/0407 414/276 |
| 4,492,504 | A | * | 1/1985 | Hainsworth | B66F 9/07 414/273 |
| 5,328,316 | A | * | 7/1994 | Hoffmann | B65G 1/0435 187/404 |
| 5,813,826 | A | * | 9/1998 | Martin | B65G 57/005 271/9.07 |
| 5,877,962 | A | * | 3/1999 | Radcliffe | G06Q 10/08 280/79.2 |
| 6,923,612 | B2 | * | 8/2005 | Hansl | B65G 1/0435 414/277 |
| 6,929,440 | B1 | * | 8/2005 | Grond | B65G 1/0492 414/284 |

(Continued)

FOREIGN PATENT DOCUMENTS

| CN | 104097923 | 10/2014 |
|---|---|---|
| CN | 104555222 | 4/2015 |

(Continued)

*Primary Examiner* — Ko H Chan
(74) *Attorney, Agent, or Firm* — Amin, Turocy & Watson, LLP

(57) ABSTRACT

A picking rack is provided, including a frame having at least one inclined pallet. The inclined pallet includes a pair of fork plates for picking up goods and a blocking mechanism for fixing loaded goods to the inclined pallet. Therefore, the labor cost of picking up goods is reduced, and the goods picking up efficiency is increased.

19 Claims, 13 Drawing Sheets

(56) References Cited

U.S. PATENT DOCUMENTS

| | | | | |
|---|---|---|---|---|
| 7,128,521 B2 * | 10/2006 | Hansl | ............... | B65G 1/0435 |
| | | | | 414/807 |
| 9,378,482 B1 | 6/2016 | Pikler et al. | | |
| 10,633,184 B2 * | 4/2020 | Lert | ............... | B65G 1/1373 |
| 2003/0219323 A1 * | 11/2003 | Shoup | ............... | B65D 19/44 |
| | | | | 410/31 |
| 2005/0047895 A1 * | 3/2005 | Lert, Jr. | ............ | B65G 1/1378 |
| | | | | 414/273 |
| 2010/0268374 A1 | 10/2010 | Jung | | |
| 2016/0236867 A1 | 8/2016 | Brazeau | | |

FOREIGN PATENT DOCUMENTS

| | | |
|---|---|---|
| CN | 105129304 | 12/2015 |
| CN | 106335042 | 1/2017 |
| CN | 106743014 | 5/2017 |
| CN | 107225101 | 10/2017 |
| CN | 207061040 | 3/2018 |
| TW | 200734256 | 9/2007 |
| TW | M428719 | 5/2012 |
| TW | 201545962 | 12/2015 |
| TW | I561449 | 12/2016 |
| TW | 201706195 | 2/2017 |

* cited by examiner

PICKING RACK

CROSS-REFERENCE TO RELATED APPLICATIONS

This application is a divisional of and a continuation-in-part of U.S. patent application Ser. No. 10/836,142, which was filed Apr. 30, 2004 now U.S. Pat. No. 7,422,995 B2 which issued Sep. 9, 2008, which is hereby incorporated by reference.

TECHNICAL FIELD

This disclosure relates to a picking rack of a goods picking up system.

BACKGROUND

In the prior art, manpower is required to pick up goods on a goods rack. However, the deficiency of manpower degrades the goods picking up efficiency.

With the rapid development of e-commerce, cons shop online, changing their traditional spending habits; therefore, shopping s are increased. In order to attract consumers, online companies have to improve the delivery speed of goods. Therefore, if the traditional manpower picking method is still in use, not only a large amount of manpower is required, but also it is difficult to improve the delivery speed of goods.

SUMMARY

The disclosure provides a picking rack, comprising: a frame provided with at least one inclined pallet including an upper layer plate and a lower layer plate; a pair of fork plates disposed on the upper layer plate; a driving mechanism disposed between the upper layer plate and the lower layer plate and configured for driving the pair of fork plates to move back and forth; and at least one blocking mechanism disposed between the upper layer plate and the lower layer plate and including a blocking rod that ascends and passes through the upper layer plate or descends to a region between the upper layer plate and the lower layer plate.

In the picking rack according to the disclosure, the pair of fork plates and the blocking rod are disposed on the inclined pallets, such that the inclined pallets pick up goods on a goods rack via the pair of fork plates automatically, without relying on manpower. Also, when the blocking rod on the inclined pallets completely descends to a pipe hole in the pipe, the goods loaded on the inclined pallets will automatically slide from the inclined pallets into the goods rack due to the effect of the inclined angle of the inclined pallets. Therefore, goods can be unloaded to and picked up from each of the inclined pallets in the picking rack automatically, thereby increasing the goods picking up efficiency and speed.

BRIEF DESCRIPTION OF DRAWINGS

The disclosure can be more fully understood by reading the following detailed description of the embodiments, with reference made to the accompanying drawings, wherein.

DETAILED DESCRIPTION

Figure 1:
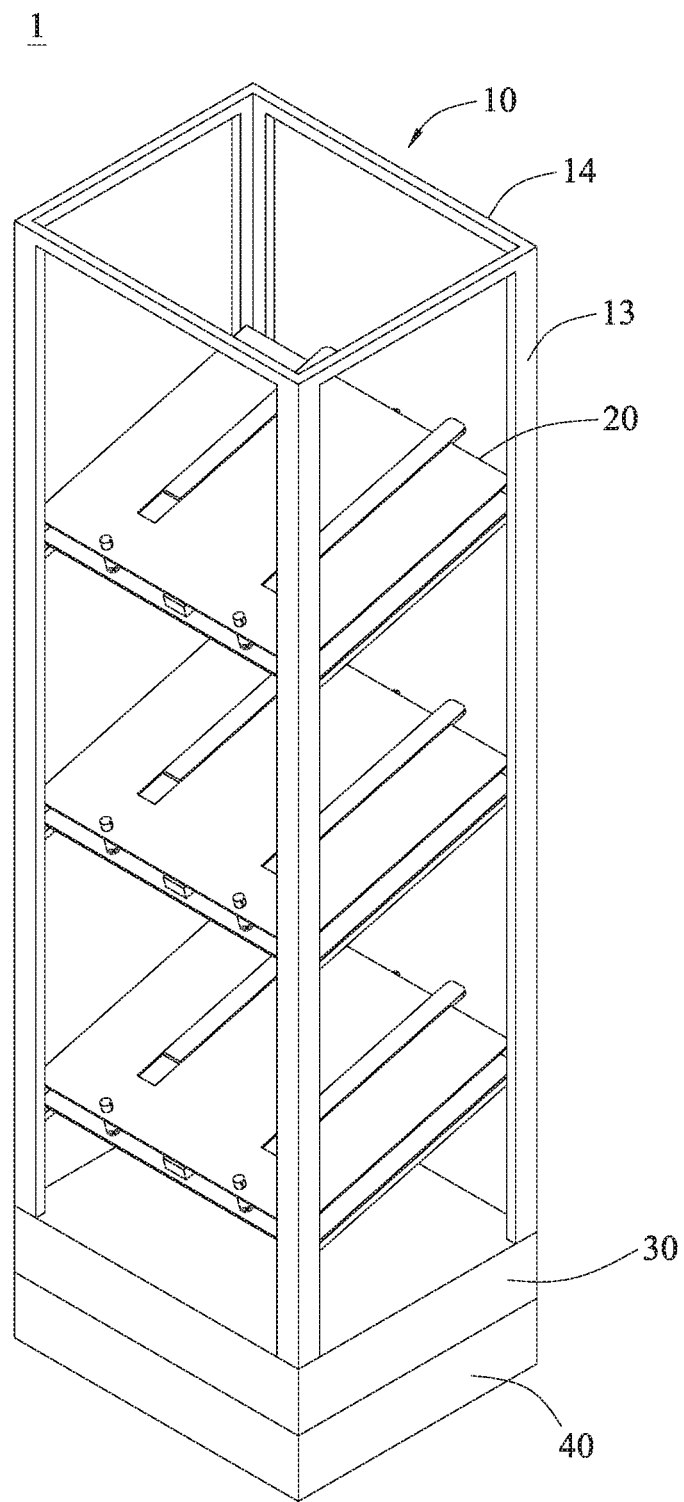
FIG. 1 is a perspective schematic diagram of a picking rack according to the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

The terminology used herein is for the purpose of describing particular devices and methods only and is not intended to be limiting of this disclosure. As used herein, the singular forms "a," "an," and "the" are intended to include the plural forms as well, unless the context clearly indicates otherwise. It will be further understood that the terms "comprises," "comprising," "includes," and "including," when used in this specification, specify the presence of stated features, integers, steps, operations, elements, and/or components, but do not preclude the presence or addition of one or more other features, integers, steps, operations, elements, components, and/or groups thereof.

FIG. 1 is a perspective schematic diagram of a picking rack 1 according to the disclosure. The picking rack 1 comprises: a frame 10 having at least one inclined pallet 20; a moving mechanism 40 disposed under the frame 10 and moving the frame 10; and an elevating mechanism 30 disposed between the frame 10 and the moving mechanism 40 and driving the frame 10 to ascend and descend.

The frame 10 further comprises four substantially parallel or no parallel support frames 13 endlong disposed on the elevating mechanism 30 and four connecting parts 14, any one of which connects two neighboring ones of the support frames 13 at the top end of the elevating mechanism 30. A plurality of inclined pallets 20 are separately disposed on the support fames 13 between the connecting parts 14 and the elevating mechanism 30.

In an embodiment, the inclined pallets 20 are fixed, by soldering, for example, to the support fames 13.

In an embodiment, the inclined pallets 20 have an inclined angle of at least, for example, about 15 degrees, allowing goods loaded thereon to slide downward.

In an embodiment, the elevating mechanism 30 comprises an escalator and an escalating motor (not shown in figures) that drives the escalator to drive the frame 10 to ascend or descend.

In an embodiment, the escalator is a fork-shaped escalator, such as a fork-shaped expanding and contracting component.

In an embodiment, the moving mechanism 40 comprises a plurality of rollers and a driving motor that drives the rollers to roll. In another embodiment, the moving mechanism 40 has a detector that detects objects on the ground and moves based on the detected objects.

Figure 2:
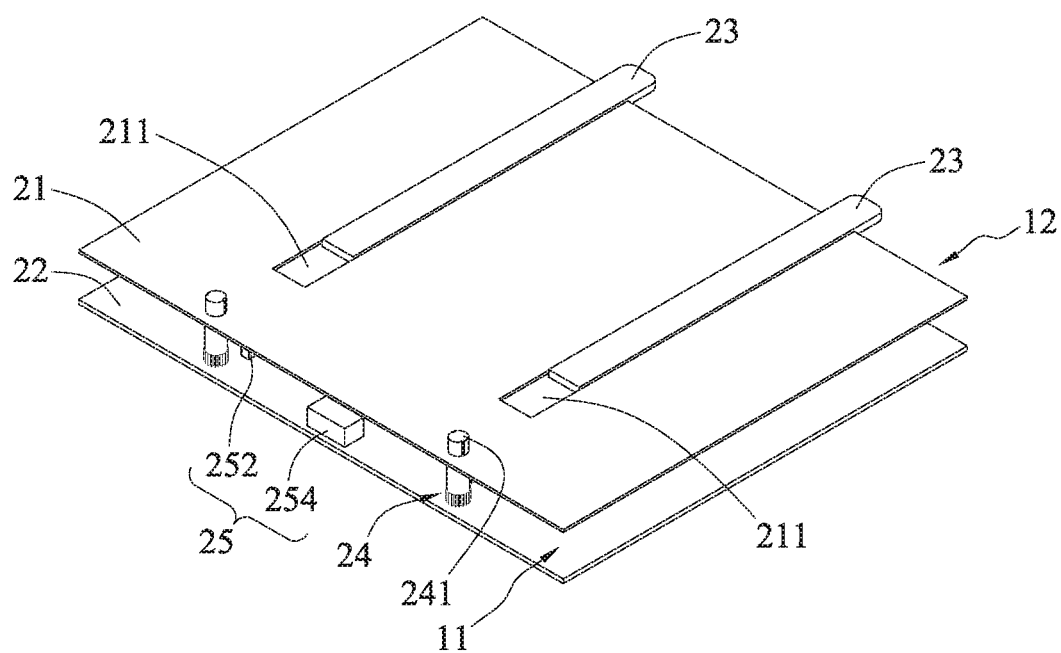
FIG. 2 is a perspective schematic diagram of an inclined pallet of a picking rack according to the disclosure.

FIG. 2 is a perspective schematic diagram of the inclined pallets 20 according to the disclosure. Each of the inclined pallets 20 has an unloading side 11 and a picking-up side 12 opposing the unloading side 11. Each of the inclined pallets 20 has an upper layer plate 21 and a lower layer plate 22. A pair of fork plates 23 are disposed on the upper layer plate 21. A driving mechanism 25 is disposed between the upper layer plate 21 and the lower layer plate 22 and drives the pair of fork plates 23 to move back and forth. A pair of blocking mechanisms 24 are disposed between the upper layer plate 21 and the lower layer plate 22. Each of the blocking mechanisms 24 has a blocking rod 241 that ascends and passes through the upper layer plate 21 or descends to a region between the upper layer plate 21 and the lower layer plate 22. The upper layer plate 21 has a pair of openings allowing the blocking rod 241 to ascend or descend therethrough. The pair of blocking mechanisms 24 are disposed on the lower layer plate 22.

Figure 3:
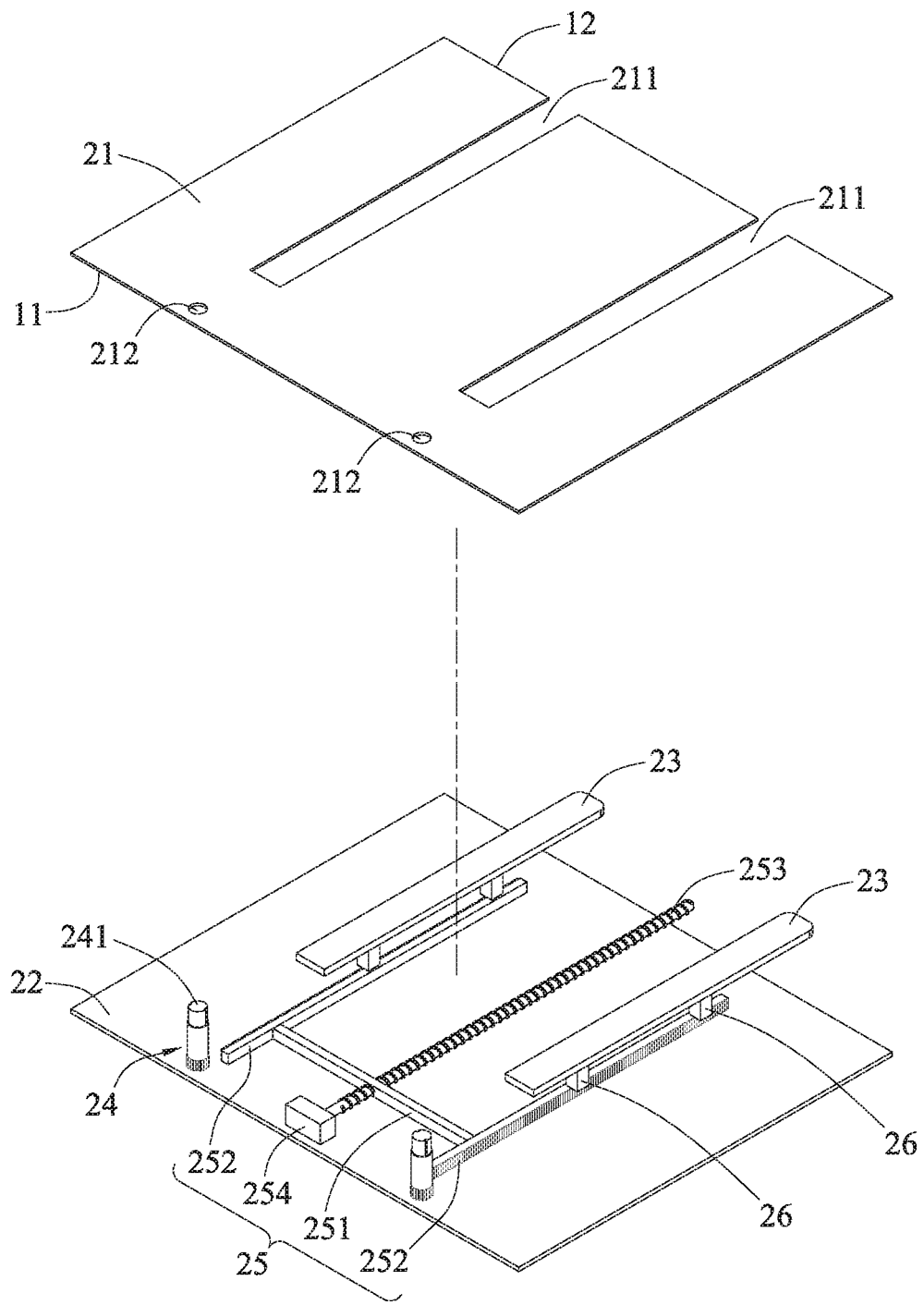
FIG. 3 is an exploded schematic diagram of an inclined pallet of a picking rack according to the disclosure.

FIG. 3 is an exploded schematic diagram of the inclined pallet 20 according to the disclosure.

The upper layer plate 21 comprises a pair of first chutes 211 disposed on the picking-up side 12 and at least one opening 212 disposed on the unloading side 11. The first chutes 211 allow the pair of fork plates 23 to be disposed therein and slide back and forth. The opening 212 allows the blocking rod 241 to ascend and descend.

Figure 4:
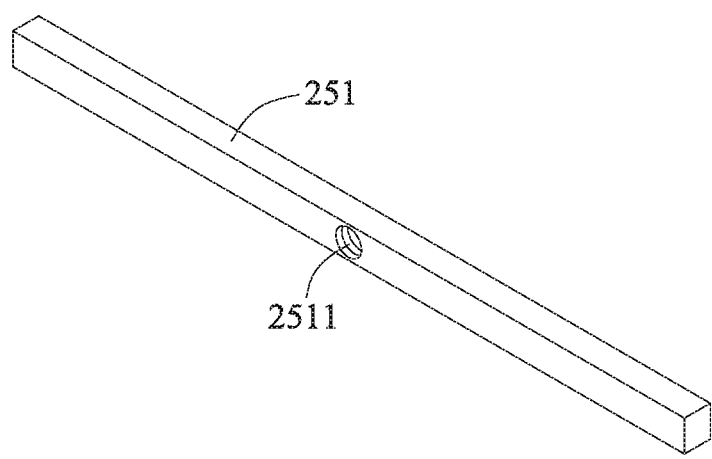
FIG. 4 is a schematic diagram of a connecting rod of a picking rack according to the disclosure.
Figure 6:
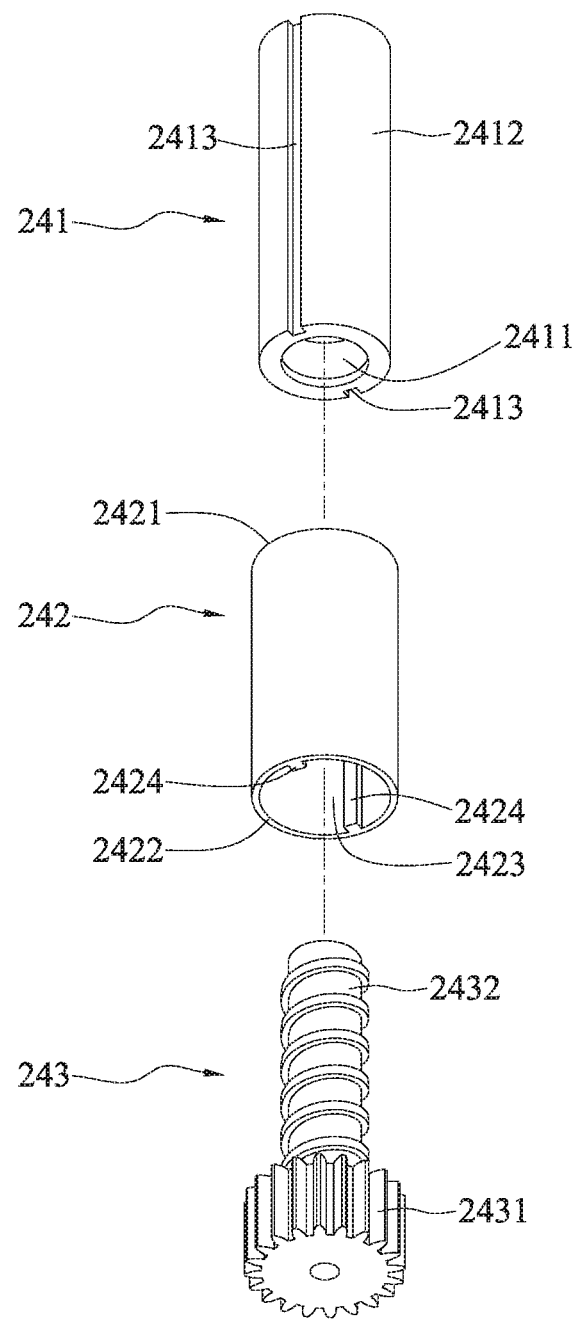
FIG. 6 is an exploded schematic diagram of a blocking mechanism of a first embodiment of a picking rack according to the disclosure.

The driving mechanism 25 comprises a connecting rod 251 having a thread hole 2511 (as shown in FIG. 4), and a pair of transmission elements 252 connected to the fork plates 23, respectively, via at least one connecting pillar 26 disposed on the transmission elements 252. The fork plates 23 are disposed above the transmission elements 252. The pair of transmission elements 252 are connected to each other via the connecting rod 251. The pair of transmission elements 252 have threads formed on the outer sides thereof, and the threads of the pair of transmission elements 252 are engaged with the transmission part 2431 of the transmission device 243 so as to drive the transmission part 2431 to rotate, as shown in FIG. 6. A main screw rod 253 is screwed to a thread hole 2511 of the connecting rod 251 and connected to the first rotating motor 254. When the main screw rod 253 is driven by the first rotating motor 254 to rotate, the connecting rod 251 is driven to move back and forth to drive the pair of transmission elements 252 and the fork plates 23 to move back and forth.

Figure 5:
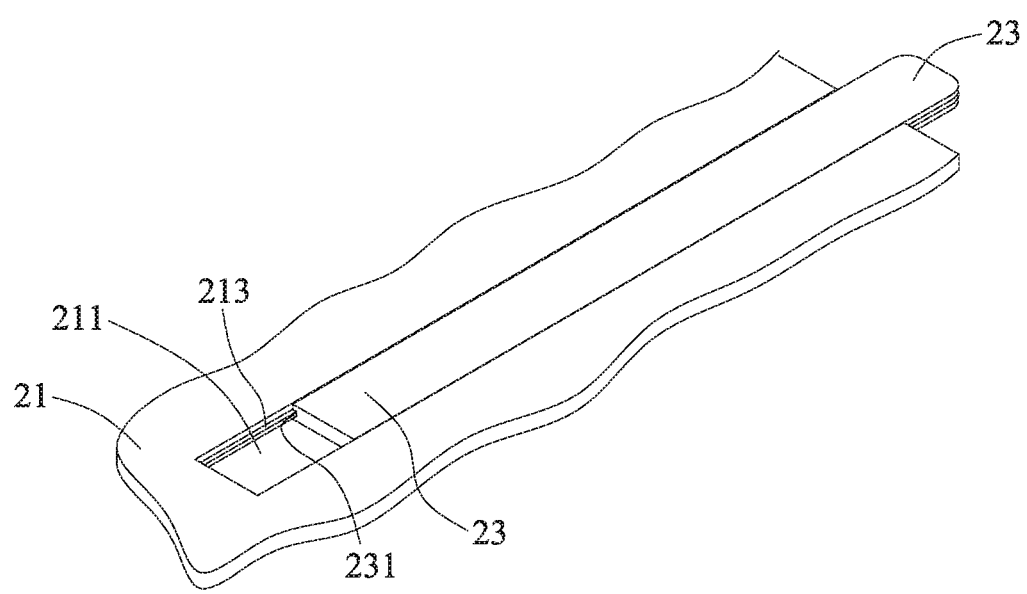
FIG. 5 is a schematic diagram of fork plates and a first chute of a picking rack according to the disclosure.

In an embodiment, as shown in FIG. 5, the fork plates 23 have opposing long lateral sides provided with grooves 231 and the first chutes 211 have opposing sides provided with protrusions 213. The fork plates 23 slide back and forth on the first chutes 211 with the grooves 231 of the fork plates 23 sliding on the protrusions 213 of the first chutes 211.

FIG. 6 is an exploded schematic diagram of a blocking mechanism 24 of a first embodiment according to the disclosure. The blocking mechanism 24 comprises the blocking rod 241, a pipe 242 and a transmission device 243. The transmission device 243 is disposed on the lower layer plate 22 and corresponds to the opening 212 of the upper layer plate 21. The transmission device 243 comprises a transmission part 2431 and a screw rod 2432 disposed on the transmission part 2431 and having an inclined thread. The transmission part 2431 may be a gear. The pipe 242 has a first end 2421, a second end 2422 opposing the first end 2421, and a pipe hole 2423 in communication with the first end 2421 and the second end 2422. The pipe 242 has a pair of sliding bars 2424 disposed on an inner pipe wall of the pipe hole 2423 and being in connection with the first end 2421 and the second end 2422. The first end 2421 is connected to the opening 212. The pipe hole 2423 is in communication with the opening 212 of the upper layer plate 21. The second end 2422 abuts against the transmission part 2431 of the transmission device 243. The screw rod 2432 of the transmission device 243 is disposed in the pipe hole 2423 of the pipe 242. The blocking rod 241 is a sleeve. The inner wall 2411 of the sleeve has an inclined thread. The outer wall 2412 of the sleeve has at least one second chute 2413. Please refer to FIG. 6, the blocking rod 241 is disposed on the transmission part 2431 and sleeves the screw rod 2432 in the pipe hole 2423 of the pipe 242. By the inner wall 2411 being screwed to the screw rod 2432 and the second chute 2413 abutting against the sliding bar 2424 of the pipe 242, the blocking rod 241 ascends and descends.

Figure 7A:
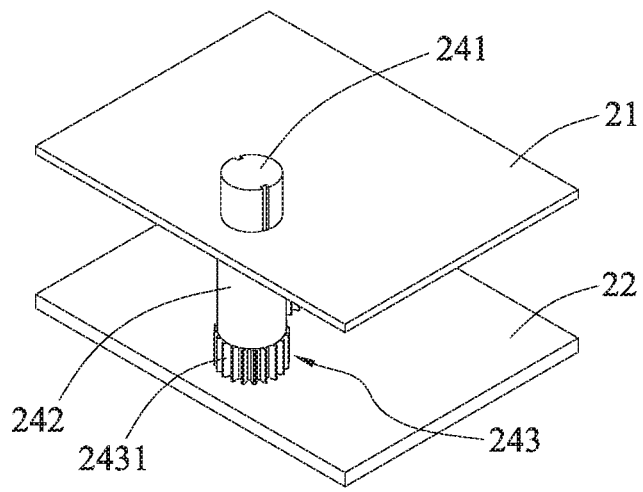
FIGS. 7A and 7B are schematic diagrams illustrating a blocking rod of a picking rack to ascend and descend, respectively, according to the disclosure.
Figure 7B:
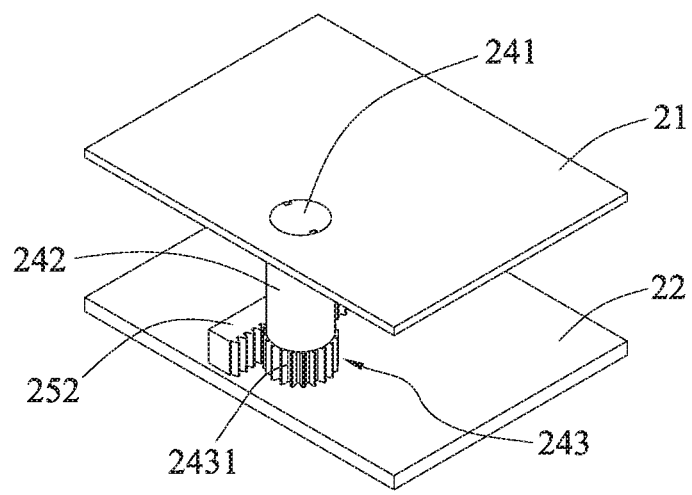

Refer to FIGS. 7A and 7B. In an embodiment, the transmission part 2431 is engaged with and moves with the pair of transmission elements 252. In an embodiment, the transmission elements 252 are teeth bars, and the transmission part 2431 is a gear. After the transmission elements 252 are engaged with the transmission part 2431, the driving mechanism 25 drives the transmission elements 252 to move, to drive the transmission part 2431 to rotate accordingly, allowing the blocking rod 241 on the screw rod 2432 to ascend and descend. Accordingly, the blocking rod 241 ascends and passes through the upper layer plate 21, or descends to a region between the upper layer plate 21 and the lower layer plate 22. The blocking rod 241 ascends and passes through the upper layer plate 21 in a blocking state, and descends to a region between the upper layer plate 21 and the lower layer plate 22 in a non-blocking state. In another embodiment, the transmission elements 252 are rubber bars, and the transmission part 2431 is a rubber wheel.

In yet another embodiment, the transmission part 2431 is a second rotating motor that drives the screw rod 2432 to rotate directly, thereby driving the blocking rod 241 to ascend and descend. The first rotating motor 254 and the second rotating motor are electrically connected to a controller (not shown in figures). In an embodiment, the transmission elements 252 are a bar without tooth thread.

Figure 8:
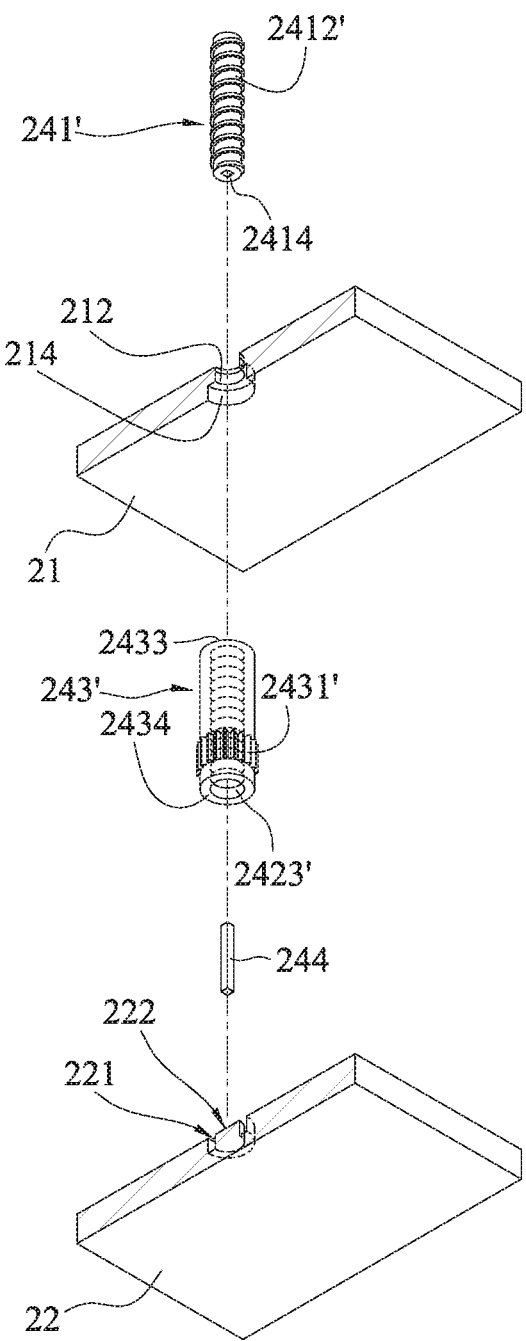
FIG. 8 is an exploded schematic diagram of a blocking mechanism of a second embodiment of a picking rack according to the disclosure.

FIG. 8 is an exploded schematic diagram of a blocking mechanism 24 of a second embodiment according to the disclosure. The blocking mechanism 24 comprises a blocking rod 241', a transmission device 243' and a pillar 244.

In the blocking mechanisms 24 of the second embodiment, a circular slot 214 in communication with the opening 212 is disposed on a lower surface of the upper layer plate 21, and an annular slot 221 corresponding to the circular slot 214 of the upper layer plate 21 is disposed on an upper surface of the lower layer plate 22. A mounting region 222 of the lower layer plate 22 is surrounded by the annular slot 221.

The transmission device 243' is a pipe, and has a first side 2433, a second side 2434 opposing the first side 2433, and a pipe hole 2423' in communication with the first side 2433 and the second side 2434. The first side 2433 of the transmission device 243' abuts against the circular slot 214 of the upper layer plate 21, and the second side 2434 of the transmission device 243' abuts against the annular slot 221 of the lower layer plate 22. The pipe hole 2423' of the transmission device 243' is in communication with the opening 212 of the upper layer plate 21. A transmission part 2431' is disposed on the outer pipe wall of the transmission device 243'. The transmission part 2431' neighbors the second side 2434, without abutting against the bottom portion of annular slot 221. A female thread (an inclined thread) is formed on an inner pipe wall of the pipe hole 2423' of the transmission device 243'. The transmission part 2431' is a gear.

The pillar 244 is fixed onto the mounting region 222 of the lower layer plate 22 and disposed in the pipe hole 2423' of the transmission device 243'.

The blocking rod 241' is a sleeve having a cylinder hole 2414. A male thread (inclined thread) is formed on the outer wall 2412' of the blocking rod 241'. The blocking rod 241' sleeves the pillar 244 in the pipe hole 2423'. The male thread on the outer wall 2412' is screwed to the female thread on the inner pipe wall of the pipe hole 2423'. The blocking rod 241' is driven by the transmission part 2431' of the transmission device 243' and ascends and descends on the pillar 244. The transmission part 2431' of the transmission device 243' rotates due to the engagement between the transmission elements 252 and the transmission part 2431'. The transmission elements 252 are driven by the driving mechanism 25 to move, to drive the transmission part 2431' to rotate. The blocking rod 241' ascends and descends on the pillar 244 through the rotation of the transmission part 2431' of the transmission device 243'.

In an embodiment, the pillar 244 is a rectangular pillar, and the shape of the cylinder hole 2414 of the blocking rod 241' is rectangular.

In an embodiment, the transmission part 2431' is a rubber wheel.

Figure 9:
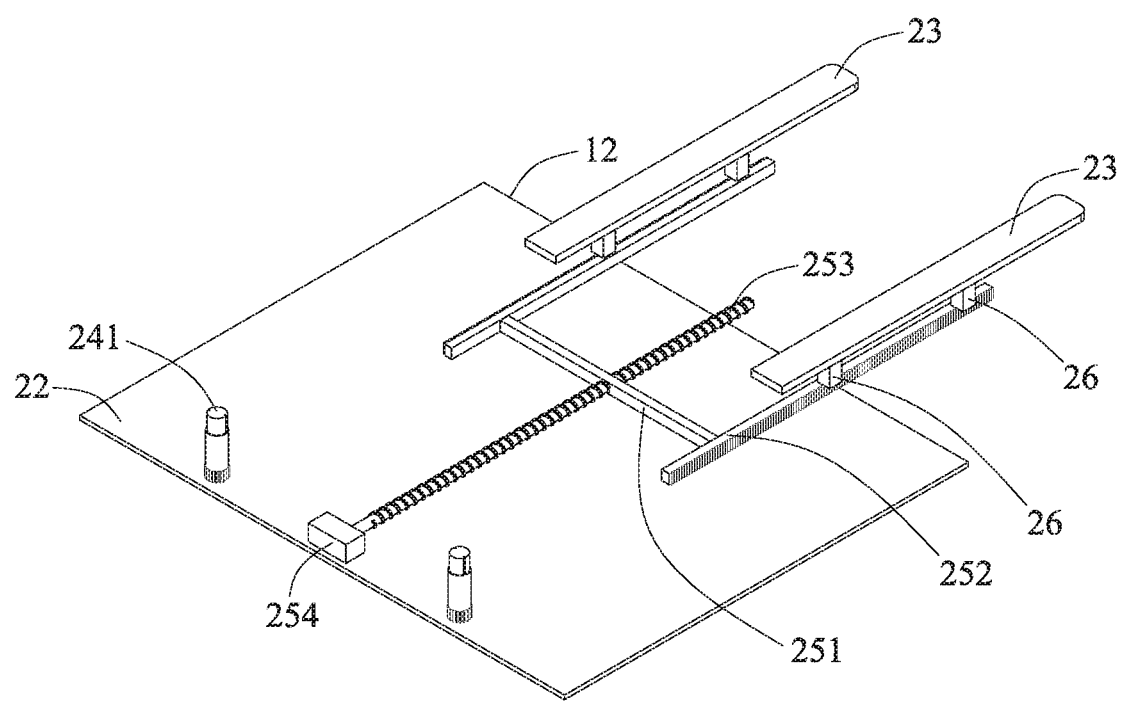
FIGS. 9, 10 and 11 are schematic diagrams illustrating a picking rack picking up goods according to the disclosure.
Figure 10:
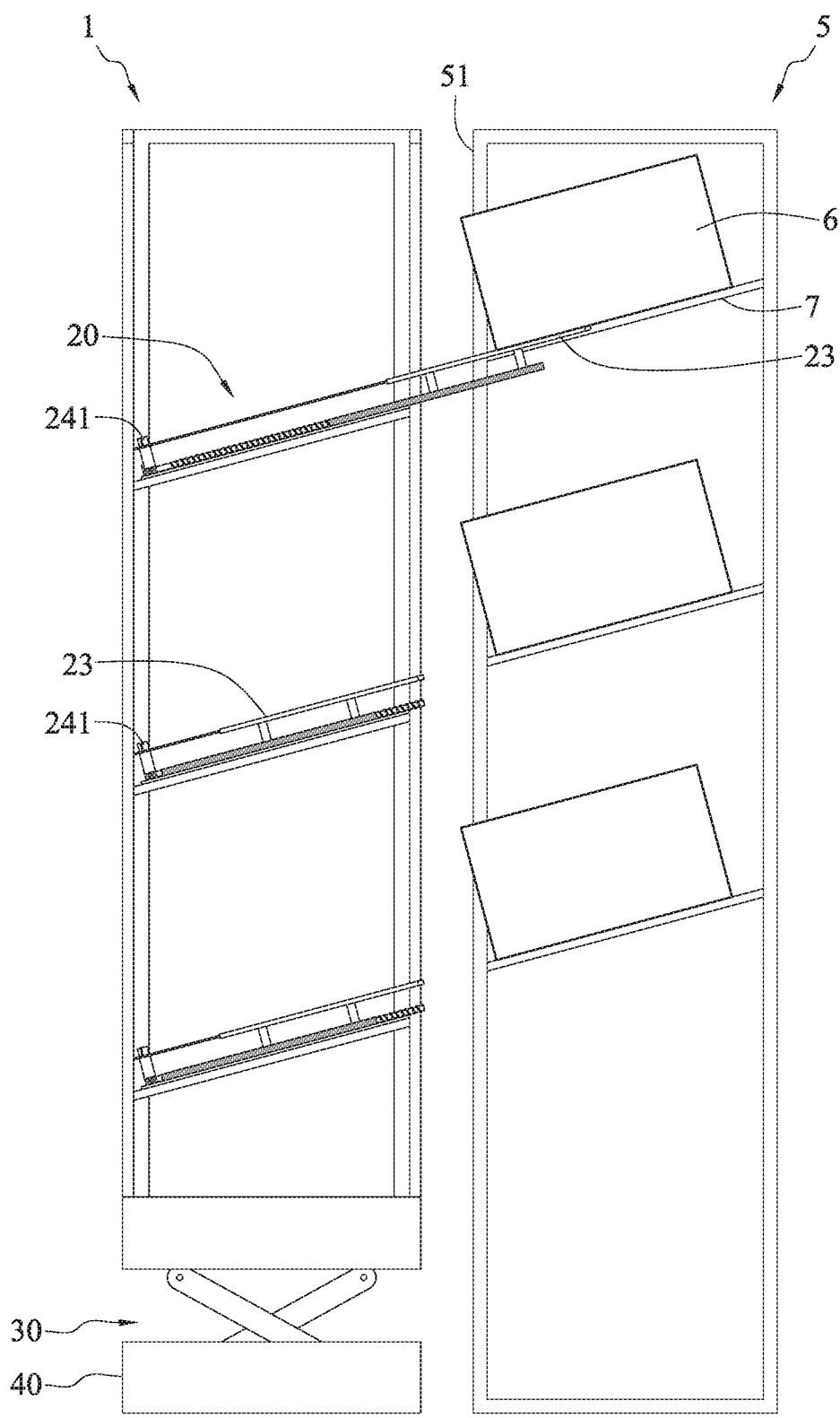
Figure 11:
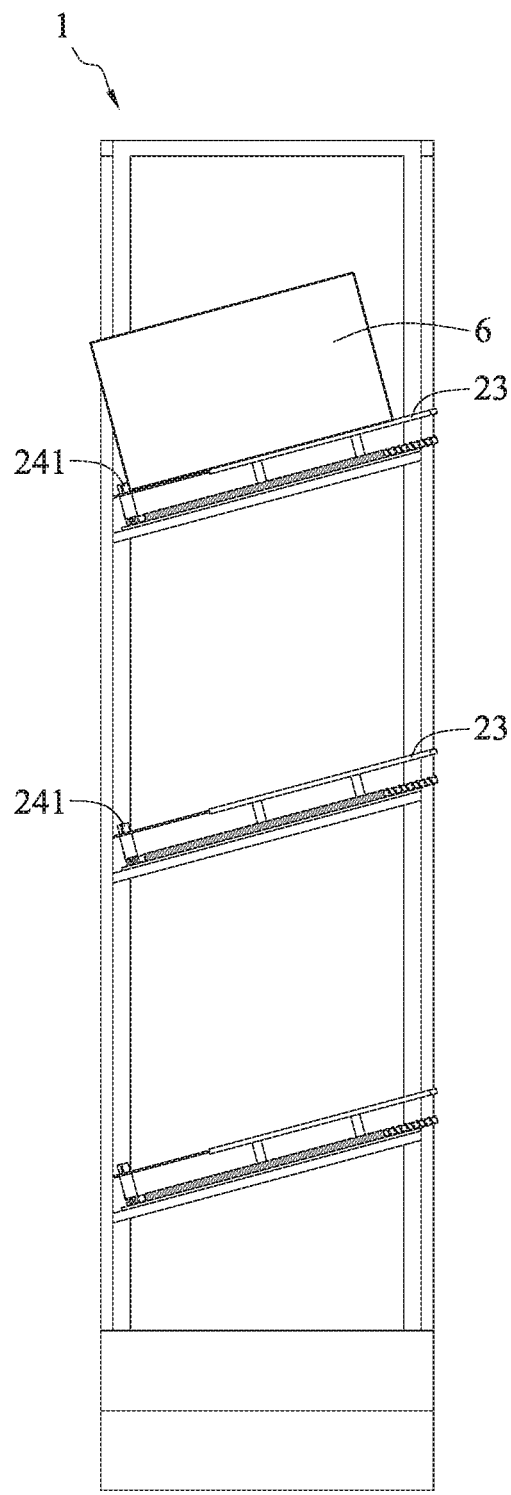

FIGS. 9-11 are schematic diagrams illustrating the picking rack 1 picking up goods according to the disclosure.

The picking rack 1 controls, through a computer controlling method disclosed in Taiwan Application Serial No. 107132455, the moving mechanism 40 to move to the side of a goods rack 5. The picking-up side 12 of the inclined pallets 20 faces a goods providing side 51 of the goods rack 5. The elevating mechanism 30 elevates the frame 10, and stops the frame 10 when the inclined pallets 20 of the frame 10 and goods placing plate 7 of the goods rack 5 have substantially the same inclined angle. Then, the first rotating motor 254 in the inclined pallets 20 controls the main screw rod 253 to rotate in a positive direction to drive the pair of fork plates 23 to move and protrude toward the goods rack 5. At the same time, the blocking rod 241 is passing through the upper layer plate 21 and is in a blocking state. When the fork plates 23 move to a region between the goods placing plate 7 of the goods rack 5 and the goods 6 placed on the goods placing plate 7 (the goods placing plate 7 has two grooves disposed under the goods on the goods placing plate, for the fork plates 23 to be inserted thereinto), the elevating mechanism 30 elevates the frame 10 again, and the pair of fork plates 23 ascend and raise the goods 6 on the goods placing plate 7. Then, the first rotating motor 254 controls the main screw rod 253 to rotate in a negative direction to drive the pair of fork plates 23 loaded with the goods 6 to retract into the inclined pallets 20. At the same time, the blocking rod 241 is kept in the blocking state. The goods 6 is thus picked up. The blocking rod 241 blocks the goods 6 from sliding on the inclined pallets 20. According to the disclosure, the transmission elements 252 are engaged with the transmission part 2431 of the transmission device 243; when the first rotating motor 254 controls the main screw rod 253 to rotate in a positive direction and the pair of transmission elements 252 and the fork plates 23 move toward the picking-up side 12 (i.e., the goods rack 5 direction), the pair of transmission elements 252 will drive the blocking rod 241 screwed onto the screw rod 2432 of the transmission device 243 to ascend; when the transmission elements 252 move toward the picking-up side 12 and are separated from the transmission part 2431, the blocking rod 241 stops ascending and passes through the upper layer plate 21; and when the fork plates 23 collect the goods 6 back to the inclined pallets 20, the transmission elements 252 and the transmission part 2431 are still separated, and the blocking rod 241 is kept in the blocking state to block the goods 6 from sliding on the inclined pallets 20. When the picking rack picks up goods, the fork plates 23 protrude, the transmission elements 252 are separated from the transmission part 2431, and the blocking rod 241 ascends.

Figure 12:
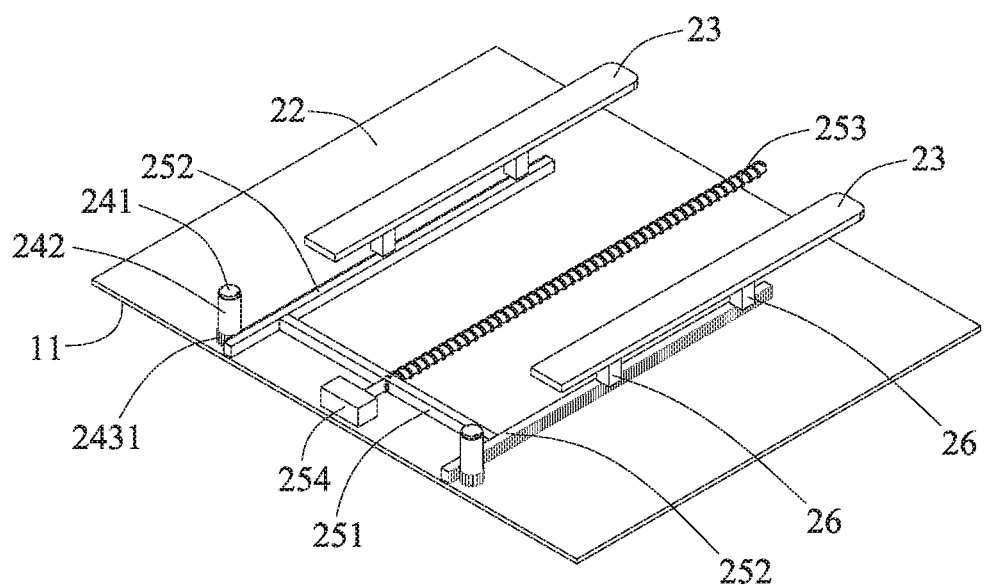
FIGS. 12 and 13 are schematic diagrams illustrating a picking rack unloading goods according to the disclosure.
Figure 13:
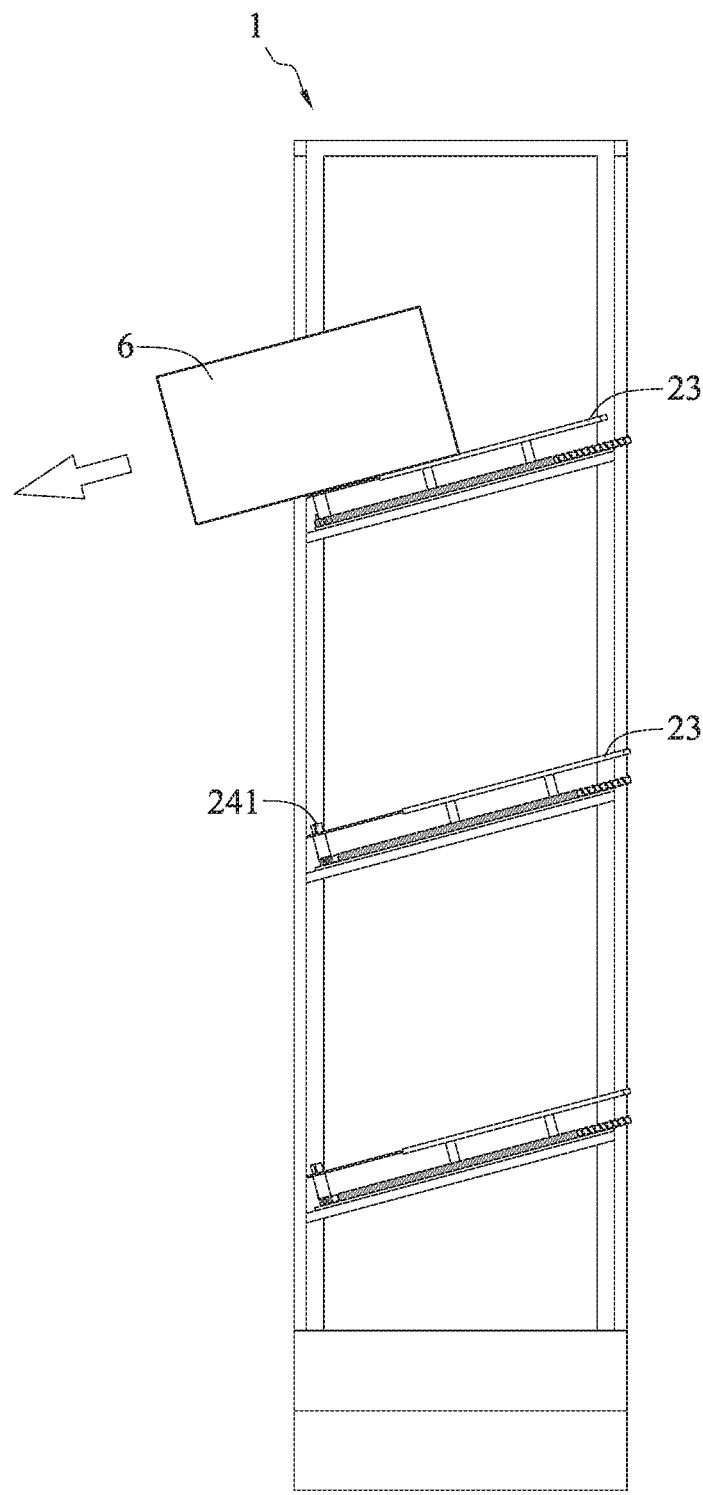

FIGS. 12 and 13 are schematic diagrams illustrating the picking rack 1 unloading goods according to the disclosure.

When the picking rack 1 unloads the goods 6 loaded on the inclined pallets 20, the first rotating motor 254 in the inclined pallets 20 controls the main screw rod 253 to rotate in a negative direction to drive the pair of transmission elements 252 to move toward the unloading side 11. When the pair of transmission elements 252 are engaged with the transmission part 2431 of the transmission device 243 and move toward the unloading side 11, the blocking rod 241 screwed onto the screw rod 2432 of the transmission device 243 is driven to descend. When the blocking rod 241 descends to a region where the blocking rod 241 is received in the pipe 242 completely, the goods 6 loaded on the inclined pallets 20 will slide from the inclined pallets 20 into the goods rack 5 due to the inclined angle of the inclined pallets 20. The goods 6 is thus unloaded. When the picking rack is unloading goods, the fork plates 23 retract again, the transmission elements 252 and the transmission part 2431 are engaged and rotate, and the blocking rod 241 descends.

It is known from the above that the picking rack according to the disclosure, the pair of fork plates and the blocking rod are disposed in the inclined pallets, and the inclined pallets automatically pick up goods on a goods rack through the pair of fork plates, without relying on manpower. When the blocking rod in the inclined pallet completely ascends to a region in the pipe, the goods loaded on the inclined pallet will automatically slide from the inclined pallet into the rack due to the effect of the inclined angle. Therefore, goods can be automatically unloaded to and picked up from each layer of the inclined pallet in the picking rack, thereby increasing the goods picking up efficiency and speed.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A picking rack, comprising:
   a frame provided with at least one inclined pallet including an upper layer plate and a lower layer plate;
   a pair of fork plates disposed on the upper layer plate;
   a driving mechanism disposed between the upper layer plate and the lower layer plate and configured for driving the pair of fork plates to move back and forth; and
   at least one blocking mechanism disposed between the upper layer plate and the lower layer plate and including a blocking rod that ascends and passes through the upper layer plate or descends to a region between the upper layer plate and the lower layer plate, wherein the upper layer plate is provided with a pair of first chutes, and the pair of fork plates slide back and forth with respect to the pair of first chutes.

2. The picking rack of claim 1, further comprising a moving mechanism disposed under the frame and configured to move the frame.

3. The picking rack of claim 2, further comprising an elevating mechanism disposed between the frame and the moving mechanism and configured for driving the frame to ascend and descend.

4. The picking rack of claim 1, wherein the inclined pallet has an unloading side and a picking-up side opposing the unloading side, the upper layer plate includes at least one opening at the unloading side, and the blocking rod of the blocking mechanism ascends and passes through the opening or descends to the region between the upper layer plate and the lower layer plate.

5. The picking rack of claim 4, wherein the blocking mechanism further comprises:
  a transmission device disposed on the lower layer plate, corresponding in position to the opening, and including a transmission part and a first screw rod disposed on the transmission part; and
  a pipe, comprising:
    a first end connected to the opening;
    a second end opposing the first end and abutting against the transmission part of the transmission device;
    a pipe hole being in communication with the first end and the second end of the pipe and the opening of the upper layer plate, with the first screw rod of the transmission device being received in the pipe hole; and
    at least one sliding bar protrusively disposed on an inner pipe wall of the pipe hole and connected to the first end and the second end,
  wherein the blocking rod is a sleeve having a thread formed on an inner wall thereof and at least one second chute formed on an outer wall thereof, the blocking rod sleeves the first screw rod in the pipe hole of the pipe, and the blocking rod ascends or descends with the thread screwed to the first screw rod and the second chute engaged on the sliding bar of the pipe.

6. The picking rack of claim 5, wherein the driving mechanism comprises:
  a connecting rod having a thread hole;
  a pair of transmission elements connected to the pair of fork plates, respectively, and connected to each other by the connecting rod; and
  a second screw rod screwed to the thread hole and configured for driving the connecting rod to move to drive the pair of transmission elements to move.

7. The picking rack of claim 6, wherein the driving mechanism further comprises a first rotating motor connected to the second screw rod and configured for driving the second screw rod to rotate.

8. The picking rack of claim 6, wherein the pair of transmission elements are in contact with and move with the transmission part of the transmission device and are configured for driving the blocking rod to ascend or descend.

9. The picking rack of claim 8, wherein the pair of transmission elements are teeth bars, and the transmission part is a gear.

10. The picking rack of claim 8, wherein the pair of transmission elements are rubber bars, and the transmission part is a rubber wheel.

11. The picking rack of claim 5, wherein the transmission part is a second rotating motor configured for driving the first screw rod to rotate to drive the blocking rod to ascend and descend.

12. The picking rack of claim 4, wherein the upper layer plate further comprises a circular slot formed on a lower surface of the upper layer plate and being in communication with the opening, and the lower layer late further comprises an annular slot formed on an upper surface of the lower layer plate and corresponding in position to the circular slot and a mounting region disposed on the lower layer plate and surrounded by the annular slot.

13. The picking rack of claim 12, wherein the blocking mechanism further comprises:
  a transmission device being a pipe, and comprising:
    a first side abutting against the circular slot of the upper layer plate;
    a second side opposing the first side and abutting against the annular slot of the lower layer plate;
    a pipe hole being in communication with the first side and the second side of the transmission device and the opening of the upper layer plate;
    a transmission part disposed on an outer pipe wall of the transmission device, neighboring the second side and being free from abutting against a bottom portion of the annular slot; and
    a female thread formed on an inner pipe wall of the pipe hole; and
  a pillar disposed on the mounting region of the lower layer plate and in the pipe hole of the transmission device,
  wherein the blocking rod is a sleeve having a male thread formed on an outer wall thereof, the blocking rod sleeves the pillar in the pipe hole of the pipe, and the blocking rod ascends or descends with the male thread on the outer wall screwed to the female thread on the inner pipe wall of the pipe hole.

14. The picking rack of claim 13, wherein the driving mechanism comprises:
  a connecting rod having a thread hole;
  a pair of transmission elements connected to the pair of fork plates, respectively, and connected to each other by the connecting rod; and
  a screw rod screwed to the thread hole and configured for driving the connecting rod to move to drive the pair of transmission elements to move.

15. The picking rack of claim 14, wherein the driving mechanism further comprises a first rotating motor connected to the screw rod and configured for driving the screw rod to rotate.

16. The picking rack of claim 14, wherein the pair of transmission elements are in contact with and move with the transmission part of the transmission device and are configured for driving the blocking rod to ascend or descend.

17. The picking rack of claim 16, wherein the pair of transmission elements are teeth bars, and the transmission part is a gear.

18. The picking rack of claim 16, wherein the pair of transmission elements are rubber bars, and the transmission part is a rubber wheel.

19. The picking rack of claim 1, wherein the inclined pallet has an inclined angle of at least 15 degrees.

* * * * *